United States Patent
Wrobel

(10) Patent No.: US 8,691,900 B2
(45) Date of Patent: Apr. 8, 2014

(54) AQUEOUS-BASED COMPOSITION SUITABLE FOR USE IN THREADLOCKING APPLICATIONS

(75) Inventor: Peter Wrobel, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/451,588

(22) Filed: Apr. 20, 2012

(65) Prior Publication Data

US 2012/0201628 A1 Aug. 9, 2012

Related U.S. Application Data

(63) Continuation of application No. PCT/EP2009/064000, filed on Oct. 23, 2009.

(51) Int. Cl.
*C09D 133/00* (2006.01)
*C09D 133/02* (2006.01)

(52) U.S. Cl.
USPC ............ 524/244; 524/301; 524/302; 524/304

(58) Field of Classification Search
USPC .................................. 525/244, 301, 302, 304
See application file for complete search history.

(56) References Cited

U.S. PATENT DOCUMENTS

| | | |
|---|---|---|
| 3,855,040 A | 12/1974 | Malofsky |
| 3,988,299 A | 10/1976 | Malofsky |
| 4,093,556 A | 6/1978 | Wojciak |
| 5,124,464 A | 6/1992 | Rosenblum et al. |
| 5,853,520 A * | 12/1998 | Rich et al. ..................... 156/293 |
| 6,025,074 A * | 2/2000 | Matsuo ....................... 428/402.2 |
| 2006/0073334 A1 | 4/2006 | Schwantes et al. |
| 2007/0021533 A1* | 1/2007 | Yan et al. ...................... 523/200 |

FOREIGN PATENT DOCUMENTS

| | | |
|---|---|---|
| EP | 0077659 B1 | 1/1987 |
| EP | 0548369 B1 | 9/1995 |
| EP | 0952198 B1 | 12/2003 |
| WO | 0001767 A1 | 1/2000 |
| WO | 2004024841 A2 | 3/2004 |
| WO | 2007018736 A2 | 2/2007 |

OTHER PUBLICATIONS

ASTM Designation: D 1193-91. Standard Specification for Reagent Water. American Society for Testing and Materials, Nov. 1991.
ASTM Designation: D 5649-01. Standard Test Method for Torque Strength of Adhesives Used in Threaded Fasteners. American Society for Testing and Materials, May 2001.

* cited by examiner

*Primary Examiner* — Kelechi Egwim
(74) *Attorney, Agent, or Firm* — Steven C. Bauman

(57) ABSTRACT

The present invention relates to aqueous-based compositions suitable for use in threadlocking applications comprising: a) at least one carboxyl group containing (co)polymer; b) at least one polymerizable monomer A containing one acryloyl group; c) at least one polymerizable compound B containing at least two acryloyl groups; d) at least one encapsulated free radical initiator; and e) water. The inventive aqueous-based compositions are preferably substantially free of volatile organic solvents.

10 Claims, No Drawings

AQUEOUS-BASED COMPOSITION SUITABLE FOR USE IN THREADLOCKING APPLICATIONS

CROSS-REFERENCE TO RELATED APPLICATION

This application is a continuation of International Patent Application No. PCT/EP2009/064000 filed Oct. 23, 2009, the contents of which are incorporated herein by reference.

FIELD OF THE INVENTION

The present invention relates to aqueous-based compositions suitable for use in threadlocking applications comprising: a) at least one carboxyl group containing (co)polymer; b) at least one polymerizable monomer A containing one acryloyl group; c) at least one polymerizable compound B containing at least two acryloyl groups; d) at least one encapsulated free radical initiator; and e) water. Significantly, the inventive aqueous-based compositions are preferably substantially free of volatile organic solvents.

The aqueous-based compositions of the invention may be used to seal or lock engineering parts, particularly interfitting parts such as fasteners, more particularly threaded fasteners such as nuts, bolts, screws, threaded nails and the like, or parts such as pipe joints which may be threaded or slip-fitted.

BRIEF DESCRIPTION OF RELATED TECHNOLOGY

Compositions which are suitable for use in threadlocking applications are known.

Such compositions find use in many applications. In general the compositions are used to lock interengaging threads together. The composition is generally placed on one or both of fasteners which have reciprocal interengaging screw threads.

When the parts are screwed together using the screw threads the composition acts to lock the threads in the desired interengaged position.

In general the applications in which aqueous-based compositions of the present invention are used include any application where it is desired to lock screwthreads together so that the components which are screwed together do not become disengaged unintentionally, for example because of vibrational or other forces. Such applications include use in the construction of automobiles etc.

Compositions have been used which must be applied at the time of threading one component into another as the compositions remain substantially liquid before cure.

Such compositions include anaerobically curable compositions.

A pre-applied composition is described in U.S. Pat. No. 4,059,136, where two physically separated deposits are applied to the threaded part. A cover coating is then applied over the deposits.

European Patent No. 0 077 659 (Thompson) describes a pre-applied polymerisable fluid for sealing and locking engineering parts. The composition has two mechanisms for curing and two curing reactions take place. The first mechanism is a UV light cure. An opacifier is dispersed in the fluid so that the fluid becomes substantially opaque to radiation. After the fluid is applied to the component it is exposed to UV radiation whereupon a coating is formed, creating a surface layer which is a dry, tack-free crust. The subcutaneous fluid is unaffected by the radiation and remains in a generally liquid state. When the component is threaded into another the surface layer breaks and the second polymerisation (such as a free radical addition polymerization) is initiated and the second cure reaction takes place. The second polymerization mechanism acts to lock the threads together.

In Thompson, only a skin is formed in the first polymerization and the remainder of the composition remains fluid below the skin. There is a risk therefore that during handling of the coated engineering parts the skin may be disrupted and the fluid composition may leak out.

European Patent No. 0 548 369 (Usami) describes a pre-applied adhesive composition for application to the threaded contact faces of a screw member such as a screw. The composition comprises a photo-hardening binder in which a secondary curable composition is dispersed. The secondary curable composition includes microencapsulated reactive monomer/activator/initiator.

WO2004/024841 A2 (Haller) describes curable compositions for application to a threaded article. The composition comprises a dispersion of components of a first cure mechanism comprising: (a) a (meth)acrylate functional monomer component; (b) a (meth)acrylate functional oligomer component; and (c) a photoinitiator component; and (ii) components of a second cure mechanism comprising: (e) an amine component; and (f) an encapsulated epoxy resin component; together with (iii) a thickener component. The photoinitiator component is suitable upon irradiation of the composition to achieve a first cure through the depth of the composition applied to a threaded article so that a binder matrix is formed with the components of the second cure mechanism dispersed through the matrix.

The aforementioned compositions of the state of the art all comprise a significant amount of volatile organic compounds (VOC). Environmental and regulatory issues have developed recently over the use of VOCs in threadlocking compositions because repeated or chronic exposure to these compounds may cause health problems.

Therefore, it would be desirable to reduce the amount of volatile organic compounds in threadlocking compositions without sacrificing other properties such as their threadlocking performance and user-friendly applicability.

SUMMARY OF THE INVENTION

The present invention provides an aqueous-based composition suitable for sealing or coating threaded fasteners and for threadlocking reciprocally threaded articles. The composition comprises a) at least one carboxyl group containing (co)polymer; b) at least one polymerizable monomer A containing one acryloyl group; c) at least one polymerizable compound B containing at least two acryloyl groups; d) at least one encapsulated free radical initiator; and e) water.

Significantly, the inventive aqueous-based compositions are preferably substantially free of volatile organic solvents.

The inventive aqueous-based composition is preferably used in a multi-step process. In a first step said composition is applied to at least one part of a fastener. At temperatures from 15° C. to 120° C. the aqueous-based composition is dried whereupon a dry and non-tacky coating is formed on surface of the fastener. In a second step the dry and non-tacky coating is cured by engaging the thread of the coated fastener with reciprocal thread of a receiver to form a reciprocally threaded article, wherein the threads of the reciprocally threaded article are bonded together by the cured product of the aqueous-based composition of the present invention. The curing process is activated by rupture of the microcapsules resulting in reaction of the polymerizable components of the aqueous-based composition with the free radical initiator, which is released from the microcapsules.

In this regard, the invention provides a coated fastener that is obtained by a process comprising the steps of:
a) providing a fastener, preferably a threaded fastener;
b) applying to at least one part of the fastener an aqueous-based composition of the present invention;
c) drying the fastener at temperatures from 15° C. to 120° C. to form a coated fastener.

Further objects of the present invention are reciprocally threaded articles having their respective threads bonded together by the cured product of the aqueous-based composition of the present invention and a method for sealing and threadlocking a reciprocally threaded article, wherein said method comprises the steps of:
a) applying to at least one part of a threaded fastener an aqueous-based composition of the present invention;
b) drying the threaded fastener at temperatures from 15° C. to 120° C. to form a coated fastener;
c) engaging the thread of the coated fastener with reciprocal thread of a receiver to form a reciprocally threaded article, wherein the threads of the reciprocally threaded article are bonded together by the cured product of an aqueous-based composition of the present invention.

Another object of the present invention is the use of the inventive aqueous-based composition for sealing or coating threaded fasteners and/or for threadlocking reciprocally threaded articles.

DETAILED DESCRIPTION OF THE PRESENT INVENTION

In a particular aspect the present invention provides an aqueous-based composition comprising:
a) at least one carboxyl group containing (co)polymer;
b) at least one polymerizable monomer A containing one acryloyl group;
c) at least one polymerizable compound B containing at least two acryloyl groups;
d) at least one encapsulated free radical initiator; and
e) water.

As used in the present invention the term "aqueous-based composition" refers to a composition that comprises at least 10 percent by weight of water, based on the total amount of the inventive composition. The aqueous-based composition of the present invention can also comprise minor amounts of other solvents, such as water-miscible solvents like alcohols.

Nevertheless it is preferred that the aqueous-based composition of the present invention is substantially free or completely free of volatile organic solvents, wherein the term "substantially free" refers to a composition that comprises, based on the total amount of the composition, less than 1 percent by weight, preferably less than 0.5 percent by weight, and more preferably less than 0.1 percent by weight of one or more volatile organic solvents.

The viscosity of the inventive aqueous-based composition is preferably in the range of 30 mPas to 30000 mPas, more preferably in the range of 300 mPas to 20000 mPas when measured by a cone and plate viscosmeter (shear rate 129 s$^{-1}$) at a temperature of 22° C.

The aqueous-based composition of the present invention can be stored for use in either a one-part or a two-part format. When formulated as a two-part composition, one part of the composition may comprise components a), b) and c) and a second part will usually contain component d).

Due to the encapsulation of the free radical initiator, the inventive aqueous-based composition can preferably be formulated as a one-part composition, which is easy to handle and exhibit high storage stability.

Component a)—Carboxyl Group Containing (Co)Polymer

The at least one carboxyl group containing (co)polymer is used as a water dispersible or water-soluble binder component in the aqueous-based composition of the present invention.

The carboxyl group containing (co)polymers of the present invention are designed to either dissolve or swell when revitalized with a base. Such dissolution or swelling brings the aqueous-based composition to the desired viscosity. Complete neutralization is typically experienced at about pH 8.0.

The preferred weight-average molecular weight of the at least one carboxyl group containing (co)polymer is in the range of 1,000 g/mol to 500,000 g/mol, and more preferably in the range of 3000 g/mol to 200,000 g/mol, as determined by gel permeation chromatography (GPC) using a polystyrene standard. If the molecular weight of the carboxyl group containing (co)polymer is less than 1,000 g/mol, the binding function of the (co)polymer can be significantly reduced.

Suitable carboxyl group containing (co)polymers include polymers having a glass transition temperature of from −20° C. to 50° C., preferably of from −10° C. to 40° C. The glass transition temperature may be measured by differential scanning calorimetry (DSC).

As used in the present invention the term (co)polymer refers to a homopolymer or copolymer.

A carboxyl group containing homopolymer can be obtained by polymerizing a carboxyl group containing ethylenically unsaturated monomer.

A carboxyl group containing copolymer can be obtained by copolymerizing at least one carboxyl group containing ethylenically unsaturated monomer and at least one ethylenically unsaturated monomer, which does not contain any carboxyl group.

Mixtures of different carboxyl group-containing ethylenically unsaturated monomers and/or mixtures of different ethylenically unsaturated monomers, which do not contain any carboxyl group, can be used to obtain the carboxyl group containing copolymers of the present invention.

Examples of the carboxyl group containing ethylenically unsaturated monomers include: unsaturated monocarboxylic acids such as acrylic acid, methacrylic acid, crotonic acid, alpha-chloroacrylic acid, and cinnamic acid; unsaturated dicarboxylic acids (acid anhydrides) such as maleic acid, maleic acid anhydride, fumaric acid, itaconic acid, itaconic acid anhydride, citraconic acid, citraconic acid anhydride, and mesaconic acid; tri- or higher-valent unsaturated polyvalent carboxylic acids (acid anhydrides); mono(2-acryloyloxyethyl)esters or mono(2-acryloyloxyethyl)esters of a non-polymerizable dicarboxylic acid such as mono(2-acryloyloxyethyl)succinate, mono(2-methacryloyloxyethyl)succinate, mono(2-acryloyloxyethyl)phthalate, and mono(2-methacryloyloxyethyl)phthalate; and ω-carboxypolycaprolactone monoacrylate and ω-carboxypolycaprolactone monomethacrylate. These carboxyl group-containing ethylenically unsaturated monomers can be used singly or in combination of two or more of them.

Examples of the ethylenically unsaturated monomer, which does not contain any carboxyl group, include aromatic vinyl compounds such as styrene, alpha-methylstyrene, o-vinyltoluene, m-vinyltoluene, p-vinyltoluene, p-chlorostyrene, o-methoxystyrene, m-methoxystyrene, p-methoxystyrene, indene, p-vinylbenzyl methyl ether, p-vinylbenzyl glycidyl ether; and aliphatic conjugated dienes such as 1,3-butadiene, isoprene, and chloroprene. These ethylenically unsaturated monomers can be used singly or in combination of two or more of them.

In particular it is desirable that the at least one carboxyl group containing (co)polymer is a copolymer composed of from 10 to 99 mole percentage, preferably of from 20 to 95 mole percentage, and more preferably of from 50 to 90 mole percentage of one or more carboxyl group containing ethylenically unsaturated monomer(s), and of from 1 to 90 mole, preferably of from 5 to 80 mole percentage, and more preferably of from 10 to 50 mole percentage of one or more ethylenically unsaturated monomer(s) that do not contain any carboxyl group.

In a preferred embodiment of the present invention the aforementioned carboxyl group containing ethylenically unsaturated monomer is selected from acrylic acid, methacrylic acid, crotonic acid, itaconic acid, fumaric acid, maleic acid, and citraconic acid and the aforementioned ethylenically unsaturated monomer, which does not contain any carboxyl group, is selected from vinyl aromatic compounds, such as styrene.

The carboxyl group containing (co)polymer or mixtures of different carboxyl group containing (co)polymers may be used in an amount of 15 to 40 percent by weight, preferably in an amount of 20 to 35 percent by weight, and more preferably in an amount of 25 to 30 percent by weight, based on the total amount of the aqueous-based composition of the present invention.

In another preferred embodiment of the present invention the at least one carboxyl group containing (co)polymer is provided as an aqueous-based emulsion or dispersion. Preferably said aqueous-based emulsion or dispersion comprises water as the only solvent and is substantially free of volatile organic solvents. Based on the total amount of the emulsion or dispersion, the solids content preferably ranges from 45 to 65 percent by weight, such as from 48 to 58 percent by weight.

Preferred aqueous-based emulsions or dispersions are selected from acrylic emulsions, styrene/acrylic emulsions, or mixtures thereof.

Examples of acrylic emulsions include poly(alkyl methacrylate-alkyl acrylate), poly(alkyl methacrylate-aryl acrylate), poly(aryl methacrylate-alkyl acrylate), poly(alkyl methacrylate-acrylic acid), and poly(alkyl acrylate-acrylonitrile-acrylic acid). The emulsion may contain a resin such as poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene) and the like.

Examples of styrene/acrylic emulsions include poly(styrene-alkyl acrylate), poly(styrene-1,3-diene), poly(styrene-alkyl methacrylate), poly(styrene-alkyl acrylate-acrylic acid), polystyrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid). The emulsion may contain a resin such as poly(styrene-butadiene), poly(methylstyrene-butadiene), poly(styrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid) and the like.

Examples of specific aqueous-based emulsions or dispersions suitable for use herein include Acrysol ASE-60, ASE-75, and ASE-95NP, Acusol 810, and Rhoplex 1-2074 available from Rohm & Haas, Co, Acronal S728, NX4533 and S888S from BASF, and NeoCryl A-1120, a product of DSM Neoresins.

Component b)—Polymerizable Monomer A Containing One Acryloyl Group

The aqueous-based composition of the present invention further comprises at least one polymerizable monomer A containing one acryloyl group.

The term "acryloyl group" as used herein refers to a functional group having the structure

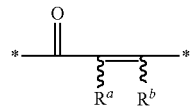

wherein $R^a$ and $R^b$ are each independently selected from hydrogen or $C_{1-12}$ alkyl and wherein $R^a$ and $R^b$ may be disposed either cis or trans about the carbon-carbon double bond. Preferably, $R^a$ and $R^b$ are each independently hydrogen or methyl.

The polymerizable monomer A of the present invention is preferably selected from hydrophobic esters of acrylic and/or methacrylic acid.

The term "hydrophobic" as used in the present invention refers to compounds that exhibit a water solubility of less than 1.0 g, preferably less than 0.8 g, and more preferably less than 0.7 g in 100 g of deionized water (ASTM D1193-91, type IV) at 22° C. and pH 7.

The hydrophobic group of the hydrophobic esters of acrylic and methacrylic acid may comprise, for example, an alkyl group, an aromatic group, a cycloalkyl group, an alkenyl group, an alkynyl group or a polyether group and may be linear or branched. In this case, the hydrophobic group is preferably an alkyl group with a length of $C_5$ to $C_{50}$, preferably $C_8$ to $C_{26}$, more particularly $C_9$ to $C_{22}$, above all $C_{10}$ to $C_{20}$ or a polyalkylene glycol, more particularly a polyethylene glycol, a polypropylene glycol or a copolymer of oxyethylene and oxypropylene units with preferably 2 to 50 and more preferably 2 to 30 recurring units, the terminal hydroxy group of the polyalkylene glycol preferably being esterified or etherified, the ester linkage preferably being formed with an acid selected from a $C_{5-50}$ carboxylic acid, more particularly a $C_{8-26}$ carboxylic acid and most preferably a $C_{16-20}$ carboxylic acid, and the ether linkage preferably being formed with a $C_{5-50}$ alcohol, more particularly a $C_{8-26}$ alcohol and most preferably a $C_{16-20}$ alcohol.

In a particular preferred embodiment the at least one polymerizable monomer A is selected from acrylic esters of formula (I), formula (I)

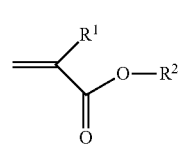

wherein $R^1$ represents hydrogen or $C_{1-12}$ alkyl and $R^2$ is selected from linear or branched $C_{5-50}$ alkyl, $C_{5-50}$ cycloalkyl, $C_{5-50}$ alkenyl, or $C_{5-50}$ alkynyl. Preferably $R^1$ represents hydrogen or methyl and $R^2$ represents $C_{10-20}$ alkyl groups or $C_{6-20}$ cycloalkyl groups.

Examples of specific suitable polymerizable monomers A for use herein include isobornyl(meth)acrylate, tetrahydrofurfuryl(meth)acrylate, cyclohexyl(meth)acrylate, t-butyl cyclohexyl(meth)acrylate and/or trimethyl cyclohexyl(meth)acrylate and/or mixtures thereof. It will be understood that the suffix (meth)acryl-denotes either acryl-or methacryl-.

The polymerizable monomer A or mixtures of different polymerizable monomers A may be used in an amount of 2 to 10 percent by weight, preferably in an amount of 3 to 9 percent by weight, and more preferably in an amount of 4 to 8 percent by weight, based on the total amount of the aqueous-based composition of the present invention.

By adding at least one polymerizable monomer A, like hydrophobic esters of (meth)acrylic acid, such as isobornyl (meth)acrylate, tetrahydrofurfuryl(meth)acrylate, cyclohexyl(meth)acrylate, t-butyl cyclohexyl(meth)acrylate and/or trimethyl cyclohexyl(meth)acrylate, to the aqueous-based composition of the present invention a dry and non-tacky coating can be formed. Comparable compositions that do not comprise at least one polymerizable monomer A, like hydrophobic esters of (meth)acrylic acid, normally lead to coatings that exhibit an unacceptable degree of tackiness.

Component c)—Polymerizable Compound B Containing at least Two Acryloyl Groups

The aqueous-based composition of the present invention further comprises at least one polymerizable compound B containing at least two acryloyl groups, wherein the polymerizable compound B is preferably selected from acryloyl-containing polyesters, acryloyl-containing polyurethanes, alkoxylated acryloyl compounds and mixtures or copolymers thereof.

Suitable acryloyl-containing polyesters are for example unsaturated polyester resins that are the polycondensation reaction product of one or more dihydric alcohols and one or more ethylenically unsaturated polycarboxylic acids. By polycarboxylic acid is meant polycarboxylic or dicarboxylic acids or anhydrides, polycarboxylic or dicarboxylic acid halides, and polycarboxylic or dicarboxylic esters. For example, suitable unsaturated polycarboxylic acids, and the corresponding anhydrides and the acid halides that contain polymerizable carbon-to-carbon double bonds, may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples thereof include the acids (and corresponding anhydrides and acid halides): orthophthalic, isophthalic, terephthalic, succinic, adipic, sebacic, methylsuccinic, and the like.

Dihydric alcohols that are useful in preparing the polyesters include, for example, 1,2-propane diol (hereinafter referred to as propylene glycol), dipropylene glycol, diethylene glycol, 1,3-butanediol, ethylene glycol, glycerol, and the like.

Examples of suitable acryloyl-containing polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acids; and mixtures comprising at least one of the foregoing acryloyl monomers.

The molecular weight of the acryloyl-containing polyesters may vary over a considerable range, but ordinarily useful polyesters have a number average molecular weight of about 300 g/mol to about 5,000 g/mol, and more preferably about 500 g/mol to about 4,000 g/mol.

Suitable acryloyl-containing polyurethanes include trifunctional urethane(meth)acrylates, such as the trifunctional urethane(meth)acrylates sold by Sartomer Company under the product names CN 929, CN 945 A60, CN 945 B85, CN 959, CN 962, CN 964, CN 965, CN 968, CN 980, CN 981, CN 983, CN 984, CN 944 B85, CN 953 B70, CN 963 B80, CN 964B85, CN 966 B85, CN 981 B88, CN 982 B88, CN 983 B88, CN 985 B88, CN 961H81, CN 966H90, CN 982 P90, CN 963 A80, CN 964 A85, CN 965 A80, CN 966 A80, CN 981 A75, CN 982 A75, CN 980 M50, CN 961 E75, CN 963 E75, CN 963 E80, CN 964 E75, CN 982 E75, CN 963 J85, CN 966 J75, CN 966 180, CN 966 R60, and CN 9641-190; hexafunctional urethane(meth)acrylates, such as the hexafunctional urethane(meth)acrylates sold by Sartomer Company under the product name CN 975; and urethane (meth)acrylates such as the urethane(meth)acrylates sold by Sartomer Company under the product names CN 972, CN 2901, CN 2902, CN 978, CN 999, CN 970H75, CN 973H85, CN 970 A60, CN 971 A80, CN 973 A80, CN 977 C70, CN 970 E60, CN 973 J75, and CN 1963; and the like; and mixtures comprising at least one of the foregoing acryloyl monomers.

Suitable alkoxylated acryloyl compounds include compounds of formula (II),

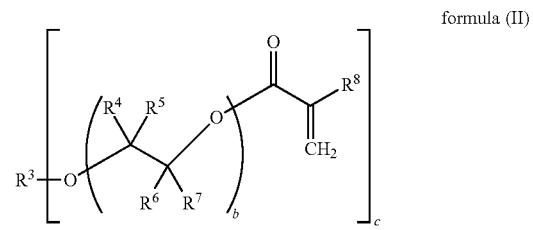

formula (II)

wherein $R^3$ is a $C_1$-$C_{250}$ organic group having a valence of c; each occurrence of $R^4$ to $R^7$ is independently hydrogen, $C_1$-$C_6$ alkyl, or $C_6$-$C_{12}$ aryl; each occurrence of b is independently 0 to about 20 with the proviso that at least one occurrence of b is at least 1; each occurrence of $R^{28}$ is independently hydrogen or methyl; and c is 2 to 10.

Within the above-stated range of 1 to about 20, the number of repeating alkoxy units, b, is preferably at least 2, more preferably at least 3. Also within this range, b is preferably up to about 15, more preferably up to about 10.

Within the above-stated range of 1 to about 10, the number of alkoxylated acrylate units, c, is preferably at least 2, more preferably at least 3. Also within this range, c is preferably up to about 8, more preferably up to about 6.

Suitable alkoxylated acryloyl compounds include, for example, (ethoxylated)$_{2-40}$ 1,6-hexanediol di(meth)acrylate, (propoxylated)$_{2-40}$ 1,6-hexanediol di(meth)acrylate, (ethoxylated)$_{2-40}$ 1,4-butanediol di(meth)acrylate, (propoxylated)$_{2-40}$ 1,4-butanediol di(meth)acrylate, (ethoxylated)$_{2-40}$ 1,3-butanediol di(meth)acrylate, (propoxylated)$_{2-40}$ 1,3-butanediol di(meth)acrylate, (ethoxylated)$_{2-40}$ ethylene glycol di(meth)acrylate, (propoxylated)$_{2-40}$ ethylene glycol di(meth)acrylate, (ethoxylated)$_{2-40}$ propylene glycol di(meth)acrylate, (propoxylated)$_{2-40}$ propylene glycol di(meth)acrylate, (ethoxylated)$_{2-40}$ 1,4-cyclohexanedimethanol di(meth)acrylate, (propoxylated)$_{2-40}$ 1,4-cyclohexanedimethanol di(meth)acrylate, (ethoxylated)$_{2-40}$ bisphenol-A di(meth)acrylate, (propoxylated)$_{2-40}$ bisphenol-A di(meth)acrylate, (ethoxylated)$_{3-60}$ glycerol tri(meth)acrylate, (propoxylated)$_{3-60}$ glycerol tri(meth)acrylate, (ethoxylated)$_{3-60}$ trimethylolpropane tri(meth)acrylate, (propoxylated)$_{3-60}$ trimethylolpropane tri(meth)acrylate, (ethoxylated)$_{3-60}$ isocyanurate tri(meth)acrylate, (ethoxylated)$_{3-60}$ isocyanurate tri(meth)acrylate, (ethoxylated)$_{4-80}$ pentaerythritol tetra(meth)acrylate, (propoxylated)$_{4-80}$ pentaerythritol tetra(meth)acrylate, (ethoxylated)$_{6-120}$ dipentaerythritol tetra(meth)acrylate, (propoxylated)$_{6-120}$ dipentaerythritol tetra(meth)acrylate.

The polymerizable compound B or mixtures of different polymerizable compounds B may be used in an amount of 10 to 30 percent by weight, preferably in an amount of 13 to 27 percent by weight, and more preferably in an amount of 18 to 25 percent by weight, based on the total amount of the aqueous-based composition of the present invention.

Component d)—Encapsulated Free Radical Initiator

The aqueous-based composition of the present invention further comprises at least one encapsulated free radical initiator, wherein said free radical initiator is encapsulated in the microcapsules. The curing is activated by rupture of the microcapsules resulting in reaction of the polymerizable components of the aqueous-based composition with the free radical initiator, which is released from the microcapsules. By curing of the aqueous-based composition of the present invention the threads of the reciprocally threaded article are bonded together. Good bond strengths, even at high temperatures can be achieved as measured by the torque required to unlock threaded articles locked to each other by aqueous-based compositions of the invention from each other.

The microcapsule itself is desirably a double walled microcapsule. An example of a double walled microcapsule is one including walls constructed of gelatin and/or polyoxymethylene urea (PMU).

It has been found that the mean diameter of the microcapsules is desirably in the range of from 100 µm to about 140 µm though it will be appreciated that individual microcapsules may have a diameter well outside these mean ranges. For example individual microcapsules can have a diameter in the range of from 50 µm to 200 µm. Suitably the mean diameter is in the range from 110 µm to about 130 µm. Typically the mean diameter will be about 120 µm.

The mean diameter is defined as a 50% limit (D50) in microcapsule distribution whereby 50% by volume of the microcapsules have a diameter below the 50% limit and 50% by volume of the microcapsules have a diameter above the 50% limit.

The mean diameter of the microcapsules can be determined by using a Laser Diffraction Particle Size Analyzer.

The free radical initiator is preferably selected from peroxide compounds such as cumene hydroperoxide (CHP); tert-butyl peroxybenzoate (TBPB); t-butylhydroperoxide (TBH), methyl ethyl ketone peroxide; benzoyl peroxide; acetyl peroxide; 2,5-dimethylhexane-2,5-dihydroperoxide; di-tert-butyl perphthalate; dicumyl peroxide; 2,5-dimethyl-2,5-bis(tert-butylperoxide)hexane; 2,5-dimethyl-2,5-bis(tert-butylperoxy)hexyne; bis(tert-butylperoxyisopropyl)benzene; di-t-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2-di-(tert-butylperoxy)butane; n-butyl-4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxide; 2,5-dimethyl-2,5-bis(2-ethylhexanoyl peroxy) hexane; p-menthane hydroperoxide; diisopropylbenzene hydroperoxide; pinene hydroperoxide; t-amyl peroxy-2-ethylhexanoate. Additionally, one or more of the free radical initiators from this list may be combined. A particular preferred free radical initiator of the present invention is benzoyl peroxide.

Non-peroxide free radical initiators may also be employed, such as, for example, 2,2'-azobis(2-methyl-propionitrile), 2,2'-azobis(2,4-methylbutanenitrile), or even in some cases a radiation cure initiator, or co-initiator.

The free radical initiator may promote curing at a temperature of 0° C. to 200° C., preferably at 10° C. to 40° C.

Desirably the concentration of the at least one free radical initiator within the capsule is between 1 and 50%, more typically between 2 to 40%, suitably 3 to 30% for example 4 to 20% (weight/weight).

The encapsulated free radical initiator or mixtures of different encapsulated free radical initiators may be used in an amount of 1 to 8 percent by weight, preferably in an amount of 2 to 7 percent by weight, and more preferably in an amount of 3 to 6 percent by weight, based on the total amount of the aqueous-based composition of the present invention.

The aqueous-based composition of the present invention may further comprise one or more additives known in the art, including, for example, thickeners, plasticizers, pigments, dyes, accelerators, adhesion promoters, crosslinking agents, fillers, and flame retardants.

If present, at least one additive or mixtures of different additives may be used in an amount of 0.1 to 20 percent by weight, preferably in an amount of 1 to 18 percent by weight, and more preferably in an amount of 3 to 15 percent by weight, based on the total amount of the aqueous-based composition of the present invention.

In particular it is desirable to include one or more thickeners to thicken the uncured aqueous-based composition which is usually liquid. The thickening of the aqueous-based composition imparts sufficient viscosity to said composition so that it has the physical properties to allow and maintain the dispersion of the other components in the composition. In particular it is desirable that the microcapsules remain dispersed throughout the aqueous-based composition. If the aqueous-based composition was not sufficiently viscous the settling out one or more components a) to d) may occur.

Suitable thickeners include, for example, organic thickener materials such as waxes and polymeric thickeners and also inorganic thickener materials such as silica.

Suitable polymeric thickener materials include polymethyl methacrylate (PMMA); polyethylene materials; fluoropolymers including polytetrafluoroethylene (Teflon) materials; nylon materials; and co polymer materials such as methyl/n-butyl methacrylate copolymers. Any of the foregoing may be provided in powder form.

Gums such as xanthum gum (also polymeric) may be utilized also.

Silica has been found to be a very useful inorganic thickener material in accordance with the present invention. It achieves the necessary thickening of the aqueous-based composition without interfering to any substantial extent with the curing of the aqueous-based composition.

Suitable silicas, such as fused silicas, may be untreated or treated so as to alter the chemical nature of their surface. Virtually any reinforcing fused silica may be used.

Particularly desirable silicas have a low ion concentration and are relatively small in particle size (e.g., on the order of about 12 µm, with a median of up to about 30 µm and as low as less than about 2 μm), such as the Silbond materials, commercially available under the tradename Aerosil 200, supplied by Evonik.

Other materials may be added as inorganic thickener materials and include those constructed of or containing aluminum oxide, silicon nitride, aluminum nitride, silica-coated aluminum nitride and micronized quartz, provided they are not basic in nature.

A further additive suitable for use in the aqueous-based compositions of the present invention is a plasticizer. While many plasticizers may be utilized, it is desirable that the plasticizer is a polymeric one. Other plasticizers may also be included in the inventive composition, examples of which include those available commercially from Union Carbide, such as under the trade designations TONE Polyol 301 and 310. Other suitable plasticizers include expandable plastic such as those sold under the trade name EXPANCEL, which is a registered trade-mark for microspheres that are small spherical plastic particles. The microspheres consist of a polymer shell encapsulating a gas. When the gas inside the shell is heated, it increases its pressure and the thermoplastic shell softens, resulting in a dramatic increase in the volume of the microspheres (by a factor of 40). The specific material that can be used is DE 80 or DE 30.

It can be useful to impart a colour to the aqueous-based compositions of the present invention, as the colour can be used as a product indicator in many ways, usually to allow for ease or recognition, for example, to indicate a particular size of bolt or nut, the customer to whom the threaded article with the pre-applied product should be delivered.

Suitable pigments or dyes include coloured metal complexes for example Fe and Co complexes. Specific examples include: Rocket Red T-13 (organic pigment based on a thermoset resin matrix including an Fe complex material available from Dayglo Color Corp); also Laser Red 2 and Laser Red 3 with similar chemistry and available from Sterling; Cobalt aluminate complexes such as the product PKSO91 from Ferro B.V. and Comet Blue 3 from Swada (both Cobalt aluminate blue spinet materials); V-9248 Blue (Cobalt chromite blue-green spinet from Ferro B.V.); F-5686 Turquoise (Cobalt chromite blue-green spinet Co(Al,Cr)2O4: MgO:ZnO from: Ferro B.V.). In general Fe complexes impart a red colour whereas Co complexes impart a blue colour.

Suitable accelerators include metallocenes, i.e., those metallocenes or metallocene containing materials that, in the presence of the aforementioned free radical initiators, effectuate polymerization of the polymerizable components of the aqueous-based composition.

Metallocenes are typically of three types, i) the dicyclopentadienyl-metals with the general formula $(C_5H_5)_2M$, ii) the dicyclopentadienyl metal halides of the formula $(C_6H_5)_2MX_s$, where X is a halide, such as Cl or Br, and s is 1, 2 or 3; and iii) monocyclopentadienyl-metal compounds with the general formula $C_5H_5MR^8{}_s$, where s is as defined above and $R^8$ is CO, NO, a halide group, an alkyl group, etc., and, in each instance, M is a transition metal, especially copper or iron, most preferably iron. Although the metallocene is preferably employed as the metallocene compound itself, the activator may also be in the form of polymers incorporating the metallocene and the acyl, alkyl, hydroxyalkyl and alkenyl derivatives of the metallocenes, preferably such derivatives having from 1 to 18, preferably from 1 to 8, carbon atoms, as well as combinations of any of the foregoing.

Suitable metallocenes include ferrocene, n-butyl ferrocene, titanocene and cupricene. These and other metallocenes and their preparation are described in, e.g., Malofsky—U.S. Pat. No. 3,855,040, Wojciak—U.S. Pat. No. 4,093,556, and Rosenblum et. al.—U.S. Pat. No. 5,124,464. As noted above, the preferred accelerators are those metallocenes that are based on iron, especially ferrocene itself, as well as the various derivatives thereof, particularly n-butyl ferrocene.

The metallocene or metallocene based accelerators can be present in an amount of from about 0.001 to about 5 wt %, preferably from about 0.01 to about 2 wt %, most preferably from about 0.05 to about 0.1 wt %, based on the total amount of the aqueous-based composition.

The aqueous-based compositions of the present invention may further comprise at least one adhesion promoter. The adhesion promoter is any organic compound that contains an adhesion promoting group that can assist in the adhesion of the aqueous-based composition or the cured product of the aqueous-based composition to a surface, such as a metal.

The adhesion promoting group can be a hydroxide, amine, or mercaptan group, any of which may be aliphatic, aryl or heteroaryl.

Preferably, the adhesion promoting group is a ketoximine; acetarylamide; hydroxy silane or silicone; aryl or heteroaryl hydroxide (e.g phenolic hydroxide); N-containing heterocycle (e.g as imidazole, benzimidazole, triazole, benztriazole, thiazole, isothiazole); acid anhydride; β-diketone, β-keto ester, β-keto aldehyde β-keto heterocycle group; or an acid group (especially carboxylic acid, phosphonic acid and sulphonic acid group).

Preferred adhesion promoters include methacryloxyethyl succinate, methacryloxyethyl maleate and bis(methacryloxyethyl) phosphate, and/or combinations thereof.

The adhesion promoter or mixtures of different adhesion promoters can be present in an amount of from 0.01 to 5 wt %, preferably from 0.1 to 2 wt %, most preferably from 0.4 to 0.8 wt %, based on the total amount of the aqueous-based composition.

Crosslink agents suitable for use with the present invention include any known crosslinking material provided that the physical and chemical stability of the aqueous-based composition is substantially unaffected by inclusion of the crosslinking material. In some embodiments of the present invention, the aqueous-based compositions may comprise at least one crosslinking agent selected from allyl methacrylate (ALMA); divinylbenzene (DVB); 1,3-butanediol dimethacrylate (BGDMA); tripropyleneglycol diacrylate (TRPGDA); trimethylolpropane trimethacrylate (TMPTMA); trimethylolpropane triacrylate (TMPTA) and combinations thereof.

The crosslinking agent or mixtures of different crosslinking agents can be present in an amount of from about 0.01 to about 10 wt %, preferably from about 1 to about 8 wt %, most preferably from about 2 to about 5 wt %, based on the total amount of the aqueous-based composition.

Other additives may also be included in the inventive aqueous-based compositions to confer additional physical properties, such as fillers, flame retardants and/or compounds that enhance resistance to thermal degradation [for instance, maleimide compounds such as N,N'-meta-phenylene bismaleimide (see U.S. Pat. No. 3,988,299)].

In one preferred embodiment of the present invention the aqueous-based composition comprises, based on the total amount of the aqueous-based composition:
  a) from 15 to 40 percent by weight, more typically from 20 to 35 percent by weight, suitably from 25 to 30 percent by weight, for example from 26 to 29 percent by weight of at least one carboxyl group containing (co)polymer;
  b) from 2 to 10 percent by weight, more typically from 3 to 9 percent by weight, suitably from 4 to 8 percent by weight, for example from 5 to 7 percent by weight of at least one polymerizable monomer A containing one acryloyl group;

c) from 10 to 30 percent by weight, more typically from 13 to 27 percent by weight, suitably from 18 to 25 percent by weight, for example from 20 to 24 percent by weight of at least one polymerizable compound B containing at least two acryloyl groups;

d) from 1 to 8 percent by weight, more typically from 2 to 7 percent by weight, suitably from 3 to 6 percent by weight, for example from 3 to 5 percent by weight of at least one encapsulated free radical initiator;

e) from 10 to 72 percent by weight of water; more typically from 20 to 60 percent by weight, suitably from 25 to 50 percent by weight, for example from 30 to 40 percent by weight of water; and f) from 0 to 20 percent by weight, more typically from 0.1 to 20 percent by weight, suitably from 1 to 18 percent by weight, for example from 3 to 15 percent by weight of one or more additives.

The inventive aqueous-based compositions have desirable properties, such as forming a dry to touch (tack-free) coating on the surface of fasteners, like threaded fasteners. This is important because the coated fasteners do not stick together or stick to other surfaces, such as supply tubes where they could cause blockages.

In this regard, the invention also provides a coated fastener obtained by a process, comprising the steps of:

a) providing a fastener, preferably a threaded fastener;

b) applying to at least one part of the fastener an aqueous-based composition of the present invention;

c) drying the fastener at temperatures from 15° C. to 120° C., preferably from 20° C. to 90° C. to form a coated fastener.

As employed herein, the term "fastener" refers to any suitable fastening, connecting or tightening mechanism expressly including, but not limited to, threaded fasteners. Preferred fasteners are selected from bolts, screws, studs, nuts, nails, such as threaded nails, fittings and the like.

Typically the threads of the fastener engage with reciprocal threads of a receiver for the fastener for example a threaded bore or nut and the curing of the inventive composition, which forms a coating on the surface of the fastener, is activated on screw thread engagement of the fastener to act as a threadlocking composition to lock the threads together or as a thread sealant composition to provide a seal about (the threads of) the fastener. The curing process is activated by rupture of the microcapsules resulting in reaction of the polymerizable components of the aqueous-based composition with the free radical initiator, which is released from the microcapsules.

In this regard, the invention also relates to reciprocally threaded articles having their respective threads bonded together by the cured product of the aqueous-based composition of the present invention.

Additionally, the invention relates to a method for sealing and threadlocking a reciprocally threaded article, steps of which include:

a) applying to at least one part of a threaded fastener an aqueous-based composition of the present invention;

b) drying the threaded fastener at temperatures from 15° C. to 120° C., preferably from 20° C. to 90° C. to form a coated fastener;

c) engaging the thread of the coated fastener with reciprocal thread of a receiver to form a reciprocally threaded article, wherein the threads of the reciprocally threaded article are bonded together by the cured product of the aqueous-based composition of the present invention.

A final object of the invention is the use of the aqueous-based composition of the present invention for sealing or coating threaded fasteners and for threadlocking reciprocally threaded articles.

EXAMPLES

Example 1

An aqueous-based composition according to the invention was made by using the following components:

Carboxyl group containing (co)polymer:
NeoCryl A-1120, an aqueous anionic, acrylic styrene copolymer dispersion (total solids (55% w/w), commercially available from DSM Neo Resins.
Polymerizable monomer A of the present invention
Polymerizable compound B containing at least two acryloyl groups:
Ethoxylated bisphenol A dimethacrylate (EBIPMA), commercially available from Sartomer under the tradename SR348L.
Encapsulated free radical initiator:
Microencapsulated di-benzoyl peroxide.
Accelerator:
N-butyl ferrocene, commercially available from Parish Chemical Company The aqueous-based composition additionally comprises further additives, which include at least one adhesion promoter, at least one crosslinking agent, and at least one compound which enhance the resistance of the cured formulation to thermal degradation.

The components of the aqueous-based composition are given in Table 1 in amounts based on w/w of the composition excluding the encapsulated free radical initiator. The part of the composition excluding the encapsulated free radical initiator and the encapsulated free radical initiator were combined in the following ratio by weight: 97 parts of the composition excluding the encapsulated free radical initiator to 3 parts encapsulated free radical initiator.

TABLE 1

| Percent weight of components in the part of the aqueous-based composition excluding the encapsulated free radical initiator | |
|---|---|
| Component | % weight |
| NeoCryl A-1120 | 58.00 |
| Polymerizable monomer A | 6.30 |
| EBIPMA | 22.73 |
| N-butyl ferrocene | 0.06 |
| Additives | 12.91 |
| Total | 100 |

The aqueous-based composition is prepared by adding the ingredients in the order shown using high speed mixing.

To demonstrate the effect of the polymerizable monomer A, a comparative formulation was prepared which does not comprise a polymerizable monomer A of the present invention.

Example 2

Application of the Aqueous-Based Composition

The aqueous-based composition of Example 1 was applied to M10×50 threaded steel bolt specimens. All specimens were dried for 0.5 h at 70° C. to 85° C.

When using the aqueous-based composition of Example 1 a dry to touch (tack-free) coating was formed on the surface of the specimens, whereas a tacky coating was obtained, when using the aforementioned comparative formulation which does not comprise a polymerizable monomer A of the present invention.

In accordance with ASTM D5649, the coated bolts were assembled with clean matching steel nuts engaging the coated product completely. Breakaway and Prevail (after 180° rotation) strengths were measured after (a) 24 hr cure at 22° C.; (b) 24 hr cure at 22° C. followed by 2 hrs at 150° C., measured at 150° C.; (c) 24 hr cure at 22° C. followed by 2 hrs at 200° C., measured at 200° C.; and (d) 24 hr cure at 22° C. followed by 2 hrs at 250° C., measured at 250° C. Results are shown in Table 2:

TABLE 2

Strength Performance on M10 bolts

| Conditions | Break strength |
|---|---|
| 24 hr cure at 22° C. | 23 Nm |
| 150° C. hot strength | 13 Nm |
| 200° C. hot strength | 12 Nm |
| 250° C. hot strength | 15 Nm |
| | Prevail strength |
| 24 hr cure at 22° C. | 13 Nm |
| 150° C. hot strength | 10 Nm |
| 200° C. hot strength | 12 Nm |
| 250° C. hot strength | 7 Nm |

I claim:

1. An aqueous-based composition comprising:
   a) at least one carboxyl group containing (co)polymer containing (i) 10 to 99 mole percentage of one or more carboxyl group containing ethylenically unsaturated monomer(s) selected from the group consisting of acrylic acid, methacrylic acid, crotonic acid, itaconic acid, fumaric acid, maleic acid, and citraconic acid; and (ii) 1 to 90 mole percentage of aromatic compound that do not contain any carboxyl group;
   b) at least one polymerizable monomer A containing one acryloyl group selected from acrylic esters of formula (I),

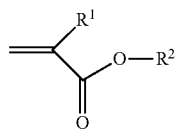

formula (I)

wherein $R^1$ represents hydrogen or $C_{1-12}$ alkyl and $R^2$ is selected from linear or branched $C_{5-50}$ alkyl, $C_{5-50}$ cycloalkyl, $C_{5-50}$ alkenyl, or $C_{5-50}$ alkynyl;
   c) at least one polymerizable compound B containing at least two acryloyl groups;
   d) at least one encapsulated free radical initiator; and
   e) water.

2. The aqueous-based composition according to claim 1, being substantially free of volatile organic solvents.

3. The aqueous-based composition according to claim 1, wherein the at least one polymerizable compound B is selected from acryloyl-containing polyesters, acryloyl-containing polyurethanes, alkoxylated acryloyl compounds and mixtures or copolymers thereof.

4. The aqueous-based composition according to claim 3, wherein the alkoxylated acryloyl compound is selected from compounds of formula (II),

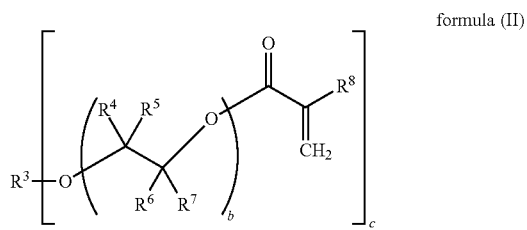

formula (II)

wherein $R^3$ is a $C_1$-$C_{250}$ organic group having a valence of c; each occurrence of $R^4$ to $R^7$ is independently hydrogen, $C_1$-$C_6$ alkyl, or $C_6$-$C_{12}$ aryl; each occurrence of b is independently 0 to about 20 with the proviso that at least one occurrence of b is at least 1; each occurrence of $R^8$ is independently hydrogen or methyl; and c is 2 to 10.

5. The aqueous-based composition according to claim 4, wherein the alkoxylated acryloyl compound is selected from (ethoxylated)$_{2\text{-}10}$ 1,6-hexanediol di(meth)acrylate, (propoxylated)$_{2\text{-}40}$ 1,6-hexanediol di(meth)acrylate, (ethoxylated)$_{2\text{-}40}$ 1,4-butanediol di(meth)acrylate, (propoxylated)$_{2\text{-}40}$ 1,4-butanediol di(meth)acrylate, (ethoxylated)$_{2\text{-}40}$ 1,3-butanediol di(meth)acrylate, (propoxylated)$_{2\text{-}40}$ 1,3-butanediol di(meth)acrylate, (ethoxylated)$_{2\text{-}40}$ ethylene glycol di(meth)acrylate, (propoxylated)$_{2\text{-}40}$ ethylene glycol di(meth)acrylate, (ethoxylated)$_{2\text{-}40}$ propylene glycol di(meth)acrylate, (propoxylated)$_{2\text{-}40}$ propylene glycol di(meth)acrylate, (ethoxylated)$_{2\text{-}40}$ 1,4-cyclohexanedimethanol di(meth)acrylate, (propoxylated)$_{2\text{-}40}$ 1,4-cyclohexanedimethanol di(meth)acrylate, (ethoxylated)$_{2\text{-}40}$ bisphenol-A di(meth)acrylate, (propoxylated)$_{2\text{-}40}$ bisphenol-A di(meth)acrylate, (ethoxylated)$_{3\text{-}60}$ glycerol tri(meth)acrylate, (propoxylated)$_{3\text{-}60}$ glycerol tri(meth)acrylate, (ethoxylated)$_{3\text{-}60}$ trimethylolpropane tri(meth)acrylate, (propoxylated)$_{3\text{-}60}$ trimethylolpropane tri(meth)acrylate, (ethoxylated)$_{3\text{-}60}$ isocyanurate tri(meth)acrylate, (ethoxylated)$_{3\text{-}60}$ isocyanurate tri(meth)acrylate, (ethoxylated)$_{4\text{-}80}$ pentaerythritol tetra(meth)acrylate, (propoxylated)$_{4\text{-}80}$ pentaerythritol tetra(meth)acrylate, (ethoxylated)$_{6\text{-}120}$ dipentaerythritol tetra(meth)acrylate, (propoxylated)$_{6\text{-}120}$ dipentaerythritol tetra(meth)acrylate.

6. The aqueous-based composition according to claim 1, wherein the free radical initiator comprises one or more peroxide compounds.

7. The aqueous-based composition according to claim 1, wherein the aqueous-based composition further comprises one or more additives selected from thickeners, plasticizers, pigments, dyes, accelerators, adhesion promoters, crosslinking agents, fillers, and flame retardants.

8. The aqueous-based composition according to claim 1, wherein based on its total amount the aqueous-based composition comprises:
   a) from 15 to 40 percent by weight of at least one carboxyl group containing (co)polymer;
   b) from 2 to 10 percent by weight of at least one polymerizable monomer A containing one acryloyl group;
   c) from 10 to 30 percent by weight of at least one polymerizable compound B containing at least two acryloyl groups;
   d) from 1 to 8 percent by weight of at least one encapsulated free radical initiator;

e) from 10 to 72 percent by weight of water; and f) from 0 to 20 percent by weight of one or more additives.

9. The aqueous-based composition according to claim 2, wherein the carboxyl group containing (co)polymer is composed of 10 to 99 mole percentage of one or more carboxyl group containing ethylenically unsaturated monomer(s), and of 1 to 90 mole percentage of one or more ethylenically unsaturated monomer(s), which do not contain any carboxyl group.

10. The aqueous-based composition according to claim 9, wherein the carboxyl group containing ethylenically unsaturated monomer is selected from acrylic acid, methacrylic acid, crotonic acid, itaconic acid, fumaric acid, maleic acid, and citraconic acid, and the ethylenically unsaturated monomer, which does not contain any carboxyl group, is selected from vinyl aromatic compounds.

* * * * *

UNITED STATES PATENT AND TRADEMARK OFFICE
CERTIFICATE OF CORRECTION

PATENT NO. : 8,691,900 B2
APPLICATION NO. : 13/451588
DATED : April 8, 2014
INVENTOR(S) : Peter Wrobel Page 1 of 1

It is certified that error appears in the above-identified patent and that said Letters Patent is hereby corrected as shown below:

Column 8, line 17: Change "CN 9641-190" to -- CN964H90 --.

Column 14, lines 13 and 14: Change "copolymer" to -- (co)polymer --.

Column 14, line 14: After "dispersion", delete -- ( --.

Column 16, line 26: Change "(ethoxylated)$_{2-10}$" to -- (ethoxylated)$_{2-40}$ --.

Signed and Sealed this
Fourteenth Day of June, 2016

Michelle K. Lee
*Director of the United States Patent and Trademark Office*